(12) United States Patent
Mannheim Astete et al.

(10) Patent No.: US 10,995,028 B2
(45) Date of Patent: May 4, 2021

(54) METHOD AND APPARATUS FOR BENDING THIN GLASS

(71) Applicant: AGP América S.A., Panama (PA)

(72) Inventors: Mario Arturo Mannheim Astete, Lima (PE); Jairton Pozzebon, Lima (PE); Juan Pablo Suarez, Lima (PE); Jean-Marie Le Ny, Lima (PE)

(73) Assignee: AGP America S.A., Panama (PA)

( * ) Notice: Subject to any disclaimer, the term of this patent is extended or adjusted under 35 U.S.C. 154(b) by 277 days.

(21) Appl. No.: 15/859,413

(22) Filed: Dec. 30, 2017

(65) Prior Publication Data

US 2018/0194663 A1    Jul. 12, 2018

Related U.S. Application Data

(60) Provisional application No. 62/440,444, filed on Dec. 30, 2016.

(51) Int. Cl.
 *C03B 23/03*  (2006.01)
 *C03B 23/025* (2006.01)
 *C03B 23/035* (2006.01)

(52) U.S. Cl.
 CPC ...... *C03B 23/0256* (2013.01); *C03B 23/0252* (2013.01); *C03B 23/0305* (2013.01); *C03B 23/0352* (2013.01); *C03B 23/0357* (2013.01); *Y02P 40/57* (2015.11)

(58) Field of Classification Search
 CPC .............................. C03B 23/03; C03B 23/0302
 See application file for complete search history.

(56) References Cited

U.S. PATENT DOCUMENTS

| | | | |
|---|---|---|---|
| 787,438 A | 4/1905 | Cutler | |
| 2,518,896 A | 8/1950 | Jendrisak | |
| 2,570,309 A | 10/1951 | Black | |
| 3,122,953 A * | 3/1964 | Atkeson | C03B 33/10 |
| | | | 83/880 |
| 3,607,187 A | 9/1971 | Mcmaster | |

(Continued)

FOREIGN PATENT DOCUMENTS

| | | |
|---|---|---|
| CN | 101720308 A | 6/2010 |
| CN | 101767923 A | 7/2010 |

(Continued)

OTHER PUBLICATIONS

Schott, "D263 M Cover Glass", https://www.us.schott.com/advanced_optics/english/products/optical-materials/thin-glass/cover-glass-d-263-m/index.html, accessed Jan. 21, 2020. (Year: 2020).*

*Primary Examiner* — Cynthia Szewczyk
(74) *Attorney, Agent, or Firm* — The Morales Law Firm; Joseph L. Morales (57) ABSTRACT

The present invention provides for a method and apparatus for bending multiple sheet of thin glass at the same time on a single set of molds. Multiple sheets of thin glass are stacked onto a full surface female mold. A partial surface male mold is placed onto the thin glass stack. The male mold serves to hold the edges in place and prevents the formation of wrinkles as the glass is heated and sags to conform to the shape of the female mold. Optionally, the top mold can be enclosed and pressurized to provide a pneumatic pressure assist to form the glass. In addition, the bottom mold can be enclosed to allow for vacuum assist to form the glass.

10 Claims, 10 Drawing Sheets

(56) References Cited

U.S. PATENT DOCUMENTS

| | | | |
|---|---|---|---|
| 3,778,244 A | | 12/1973 | M Nedelec |
| 4,812,344 A | * | 3/1989 | Jaeger .................. C03B 23/047 |
| | | | 428/34.6 |
| 4,828,598 A | | 5/1989 | Imamura et al. |
| 5,004,491 A | | 4/1991 | McMaster et al. |
| 5,882,370 A | | 3/1999 | Garner |
| 9,010,153 B2 | * | 4/2015 | Ukrainczyk ........ C03B 23/0235 |
| | | | 65/104 |
| 2007/0157671 A1 | | 7/2007 | Thellier |
| 2010/0126222 A1 | | 5/2010 | Dannoux |
| 2015/0202854 A1 | | 7/2015 | Tsuchiya et al. |
| 2016/0194236 A1 | * | 7/2016 | Ghigo ................. C03B 23/0357 |
| | | | 65/23 |
| 2017/0210663 A1 | * | 7/2017 | Balduin .............. C03B 23/0357 |
| 2018/0194664 A1 | * | 7/2018 | Balduin .................. C03B 23/03 |

FOREIGN PATENT DOCUMENTS

| | | | |
|---|---|---|---|
| CN | 105985008 A | | 10/2016 |
| GB | 23917 A | | 10/1895 |
| GB | 1599 A | | 12/1902 |
| GB | 28307 A | | 6/1904 |
| GB | 933840 A | | 8/1963 |
| JP | 2012116692 A | | 6/2012 |
| WO | WO-2017029252 A1 | * | 2/2017 ......... C03B 23/0302 |

\* cited by examiner

METHOD AND APPARATUS FOR BENDING THIN GLASS

CROSS-REFERENCE TO RELATED APPLICATIONS

This application claims the benefit, under 35 U.S.C. § 119(e)(1), of provisional patent application Ser. No. 62/440,444 titled "Method and apparatus for bending thin glass," which was filed on Dec. 30, 2016, by the same inventors of this application. The aforementioned provisional application is incorporated herein by reference in its entirety, as if it were disclosed in the present document.

FIELD OF INVENTION

The present invention relates generally to the field of light weight automotive laminates and, more particularly, to an improved method and apparatus for bending thin glass.

BACKGROUND OF THE INVENTION

In response to the regulatory requirements for increased automotive fuel efficiency as well as the growing public awareness and demand for environmentally friendly products, automotive original equipment manufacturers, around the world, have been working to improve the efficiency of their vehicles.

One of the key elements of the strategy to improve efficiency has been the concept of light weighting. Often times, more traditional, less expensive, conventional materials and processes are being replaced by innovative new materials and processes which while sometime being more expensive, still have higher utility than the materials and processes being replaced due to their lower weight and the corresponding increase in fuel efficiency. Vehicle glazing has been no exception.

For many years, the standard automotive windshield has had a thickness of 5.4 mm. In more recent years, we have seen the thickness decrease to 4.75 mm. While a reduction of 0.65 mm may not seem significant, at a density of 2600 kg per cubic meter for standard soda lime glass, each millimeter that the thickness is reduced, decreases the weight by 2.6 kg per square meter. The weight of a typical 1.2 square meter windshield going from 5.4 mm to 4.75 mm is reduced by a little over 2 kg. On a vehicle with a total of 6 square meters of glass, a 1 mm reduction on all of the windows translates into a savings of 15.6 kg.

However there are limits as to have thin the glazing can be. Stress under wind load has always been a factor. With the trend towards increasing in the size of windshields in particular, wind load is even more of a concern. Glass is also becoming a structural element in more and more vehicles. The glazing contributes to the stiffness and strength of the car. Fixed glass, once bonded with a relatively soft curing poly-urethane, is being mounted with higher modulus adhesives. As a result, the glass, once isolated by rubber gaskets and soft butyl adhesives, is now much more subject to loading from the bumps in the road and vehicle torsion.

Today, windshields with a 2.1 mm outer ply, a 1.6 mm inner ply and a 0.76 mm plastic interlayer totaling just under 4.5 mm in total thickness are becoming common. This may be close to the limit of what can be done with conventional annealed soda lime glass.

Annealed glass is glass that has been slowly cooled from the bending temperature through the glass transition range. This is done to relieve stress in the glass. Annealed glass breaks into large shards with sharp edges. In a laminate, two sheets of annealed glass are glued together using a sheet of thermo plastic. If the laminated glass should break, the plastic layer holds the shards of glass together, helping to maintain the structural integrity of the glass. The shards of broken glass are held together much like the pieces of a jigsaw puzzle. A vehicle with a broken windshield can still be operated. On impact, the plastic layer also helps to prevent penetration by the occupant or by objects striking the laminate from the exterior.

Heat strengthened glass, with a compressive strength in the range of 10,000 PSI, can be used in all vehicle positions other than the windshield. Heat strengthened (tempered) glass has a layer of high compression on the outside surfaces of the glass, balanced by tension on the inside of the glass. When tempered glass breaks, the tension and compression are no longer in balance and the glass breaks into small beads with dull edges. Tempered glass is much stronger than annealed laminated glass. The limits of the typical automotive heat strengthening process are in the 3.2 mm to 3.6 mm range. This is due to the rapid heat transfer that is required. It is not possible to achieve the high surface compression needed with thinner glass using the typical blower type low pressure air quenching systems. Fortunately, there are other materials and processes available.

Glass can be chemically tempered. In this process, ions in and near the outside surface of the glass are exchanged with ions that are larger. This places the outer layer of glass in compression. The maximum strength of chemically tempered soda lime glass is limited. However, with some other glass compositions, compressive strengths in excess of 100 k PSI are possible. The practice of chemically tempering glass is well known to those of ordinary skill in the art and shall not be detailed here.

Unlike heat tempered glass, chemically tempered glass breaks into shards rather than beads. This property allows for its use in windshields. However, in standard windshield thicknesses of 2.0 mm or greater, chemically strengthened glass would actually be too strong. In the event of a crash and a head impact, the windshield must break, absorbing the energy of the impact rather than the head of the occupant. Therefore, depending upon the tempered strength, thicknesses of 1.1 mm or less must be used.

The majority of the vehicles on the road today have windshields that were made using the gravity bending process. In this process, the plies of glass that form the windshield are placed onto a mold, which supports the glass near the edges, and heated. The glass softens and sags to shape. Sometimes, for more complex shapes, gravity is assisted by pneumatic pressure and/or a partial or full surface pressing. As the plies of glass to be laminated are bent in sets, the surfaces, while they may have substantial variation from windshield to windshields, are a near perfect match.

A growing portion of windshields are made by the singlet pressing process. With this process, single sheets of glass are bent using a press to form the glass to shape. The resulting shape is much closer to design and the process can hold tighter tolerances across the surface. But, when the individually pressed sheets are glass are laminated, surface to surface variation can be more of a problem than with gravity bent glass. Thin glass is difficult to bend using either of these bending process.

During gravity bending, the edges of the sheets of glass have a tendency to lift off of the mold and form wrinkles. If the plies of glass are of different compositions, with softening points that are too far apart, it may not be possible to gravity bend at all as the glass with the lower softening point will become too soft leading to marking and distortion. In this case, the different glass types must be bent separately.

However, singlet pressing also has problems. The glass is conveyed through the heating section on rolls. The thin glass tends to bend under its own weight resulting in the leading edge hitting the rollers and even falling through. As can be appreciated, a better process is needed.

SUMMARY OF THE INVENTION

Accordingly, it is an object of the present invention to provide an improved method and apparatus for bending thin glass.

In carrying out the above object, the method of the invention comprises the steps of: stacking one or more sheets of the thin glass onto a full surface bottom mold; applying a partial surface top mold to said stack of thin glass, said top mold contacting the glass in at least the periphery area of the glass; heating said thin glass to its glass transition point; and allowing thin glass to sag under the force of gravity.

Furthermore, the apparatus of the invention comprises a bending mold base, a bending mold female ring that receives a bended glass to form a full surface female mold and a male ring mold placed onto the thin glass.

REFERENCE NUMBERS

2 Bending mold base
4 Bending mold female ring
6 Thin glass
8 Male ring mold
20 Flat sheet of glass used to form full surface female mold
22 Full surface female mold
30 Vacuum holes
32 Top plenum air inlet
34 Top plenum back
36 Bottom plenum back
38 Bottom plenum vacuum inlet

DETAILED DESCRIPTION OF THE INVENTION

Figure 1:
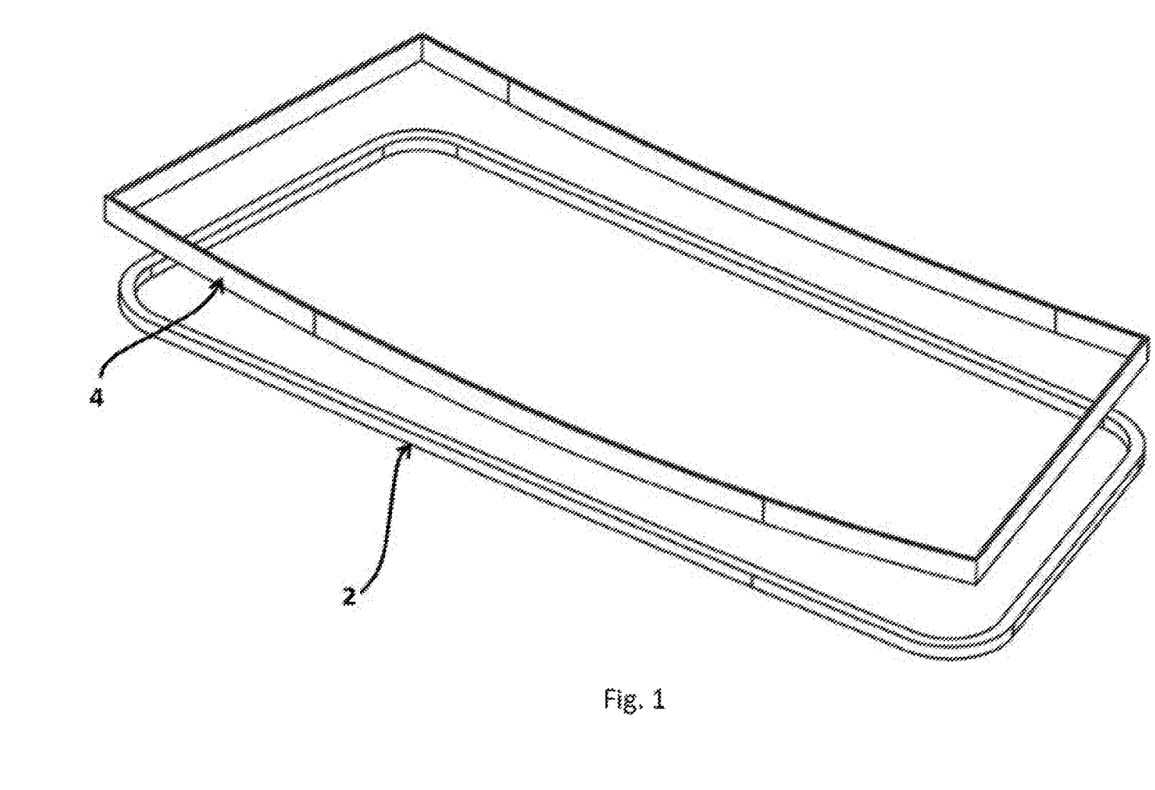
FIG. 1 is a view of the female bending mold.

Referring now in detail to the illustrative embodiment depicted in the accompanying drawings for carrying out this invention, FIG. 1 shows a bending mold base 2 and a bending mold female ring 4 for bending sheets of glasses. It should be noted, that the bending mold base 2 can vary its shape, geometry, dimensions, and area depending on the type of glass required to be manufactured. Bending mold base 2 is shown for reference, but it should be noted that any type of base can be used to carry out the invention.

Figure 2:
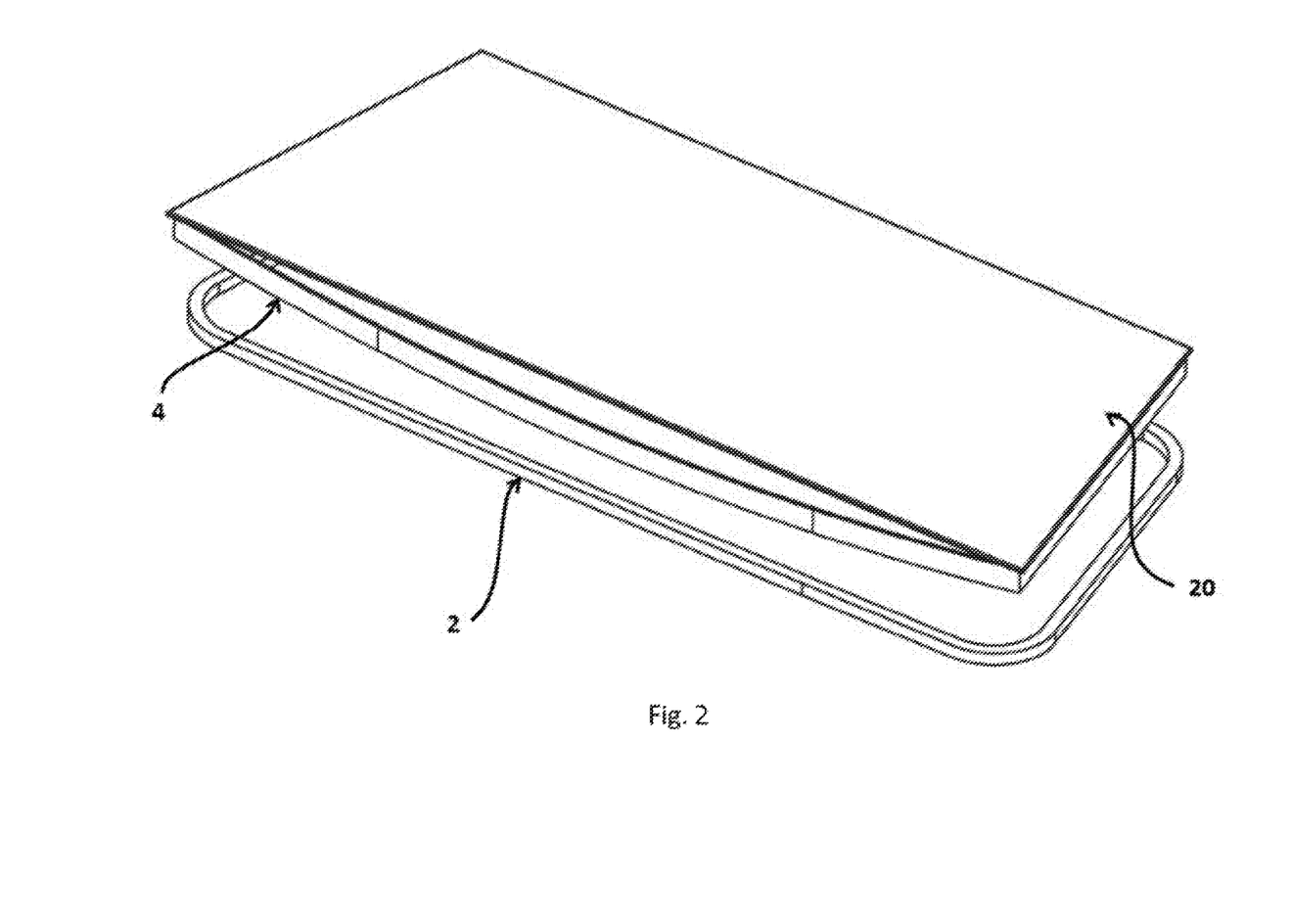
FIG. 2 is a view of the female bending mold with flat sheet of glass having a higher glass transition point than the thin glass to be bent.
Figure 3:
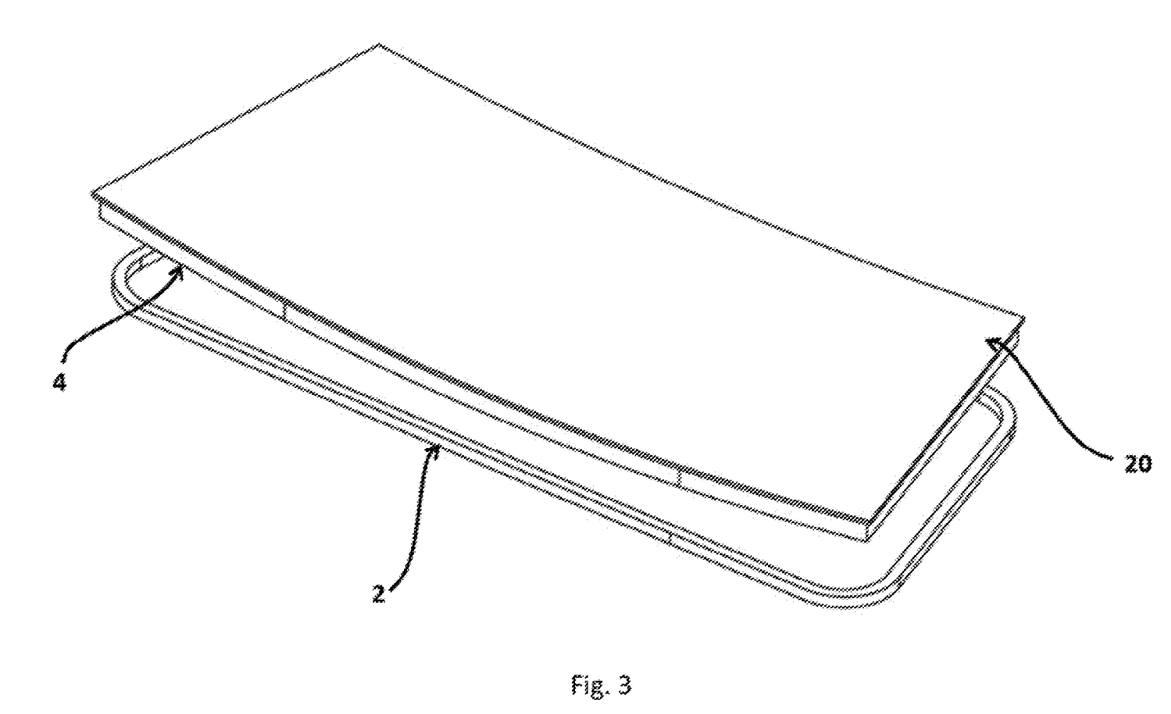
FIG. 3 is a view of the female bending mold with the higher glass transition point bent to shape.
Figure 4:
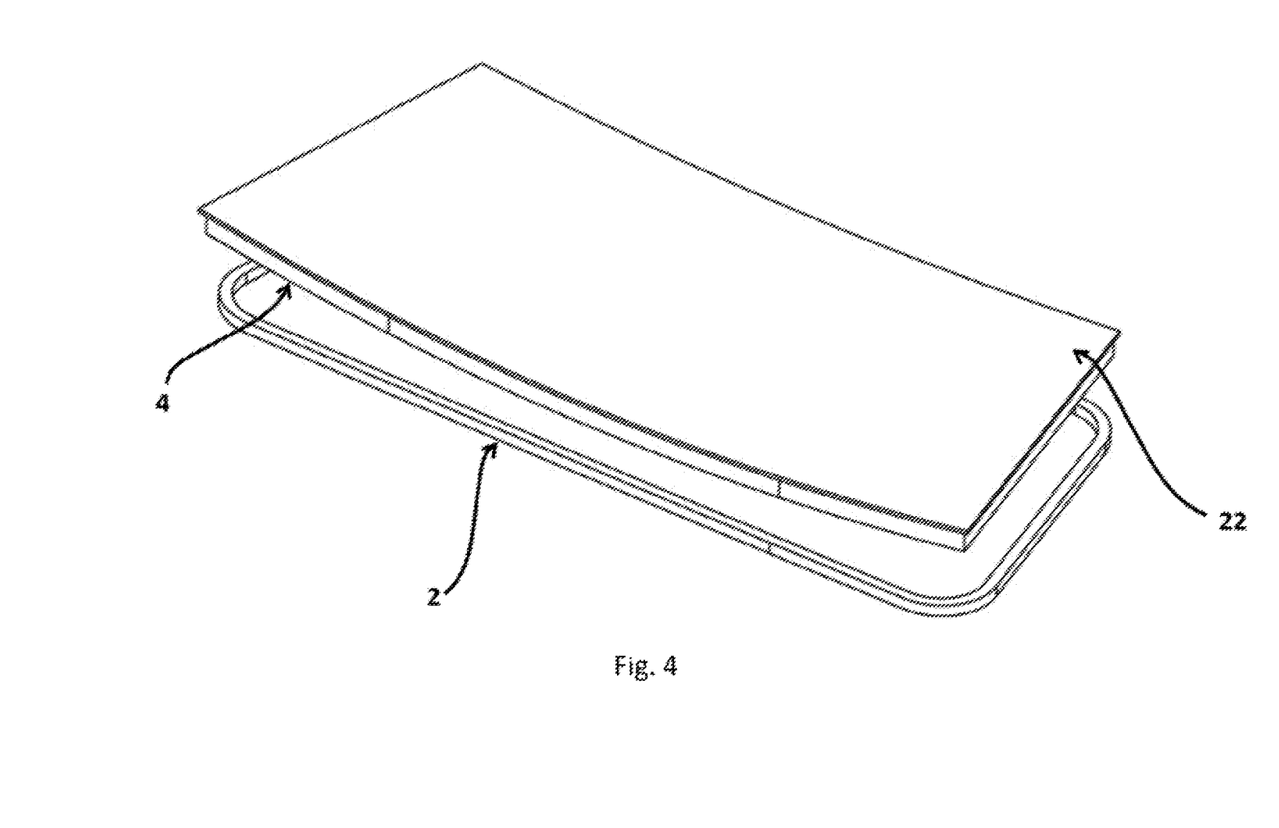
FIG. 4 is a view of the female bending mold loaded with thin flat glass.

In order to carry out the method of the present invention, a female mold has to be formed. The method and apparatus of the present invention avoid glass wrinkles and provide uniformity to form the sheet of glasses. In FIG. 2, a flat sheet of glass 20 with higher glass transition point that the thin glass to be bent has to be provided in the lower part of the set of glasses. That flat glass 20 can be bended in a separate step, in a separate tool. In additional embodiments of the present invention, the flat glass 20, as shown in FIG. 3, is subject to its glass transition point, so that it is bent to shape the bending mold female ring 4. Once the flat glass 20 has reached the shape of the ring 4, it is then allowed to cool. Once the flat glass 20 has been let to be cooled, it serves as a full surface female mold 22 when pressing the thin glass, as can be seen in FIG. 4. The flat glass 20 must have a thickness sufficient for said full surface mold 22 to retain its shape during bending of said thin glass. Alternately, other type of molds can be used, for example, a ceramic or metal full surface mold can be fabricated and used as a mold for carrying out the method of the present invention. The full surface female mold 22 can be formed by any means and of any suitable material known in the art.

Figure 5:
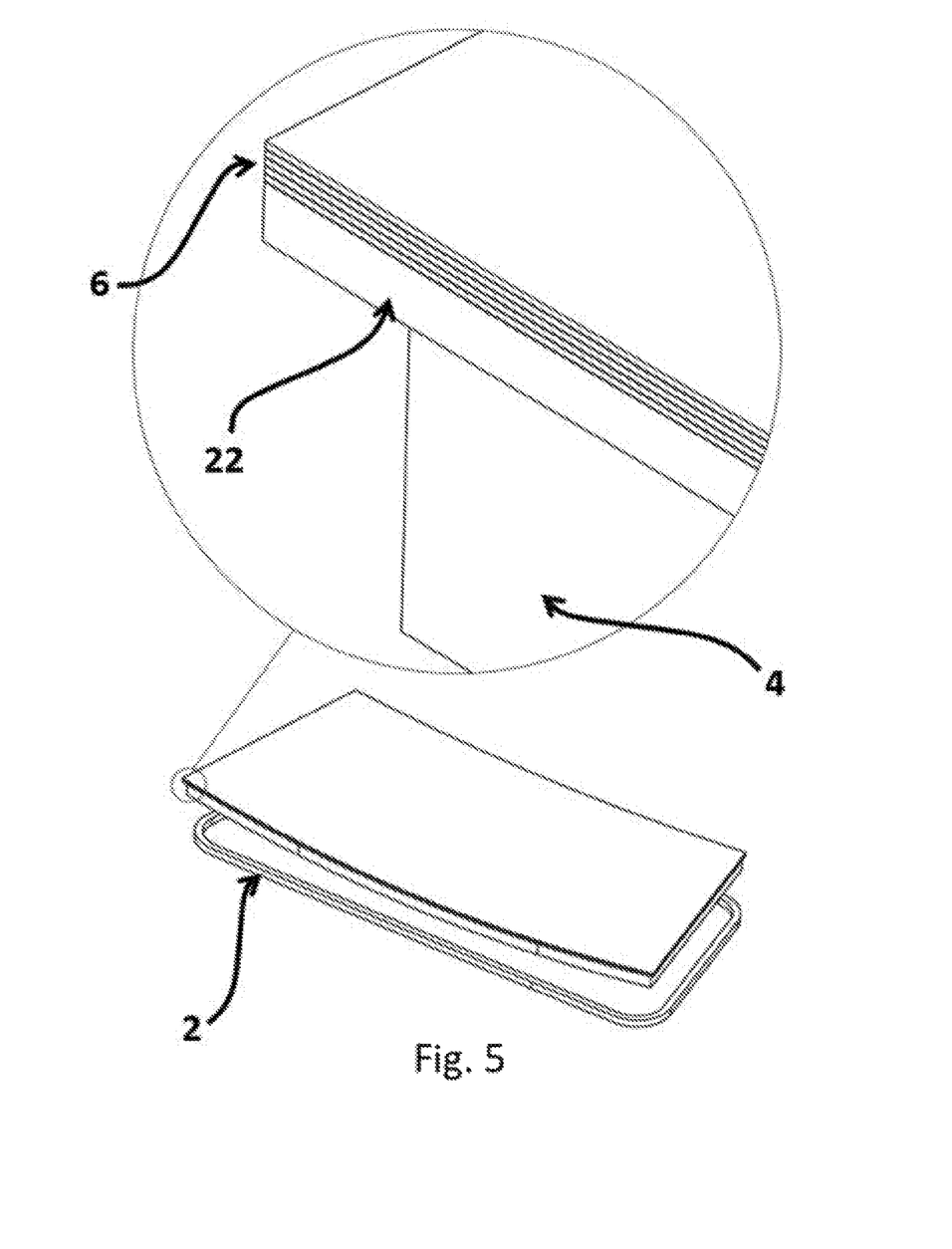
FIG. 5 is a detailed view of the female bending mold loaded with thin flat glass.

As can be seen in FIG. 5, one or more sheets of thin glass 6 are loaded and placed onto the full surface female mold 22. It should be noted that the number of sheets that can be bent at the same time will depend upon the thickness of the glass and the complexity of the shape. In a preferred embodiment, the thickness of the thin glass 6 is of less than 1.8 mm. Then, the thin glass sheets 6 will tend to sag and conform to the periphery of the full surface female mold 22 under their own weight.

Figure 6:
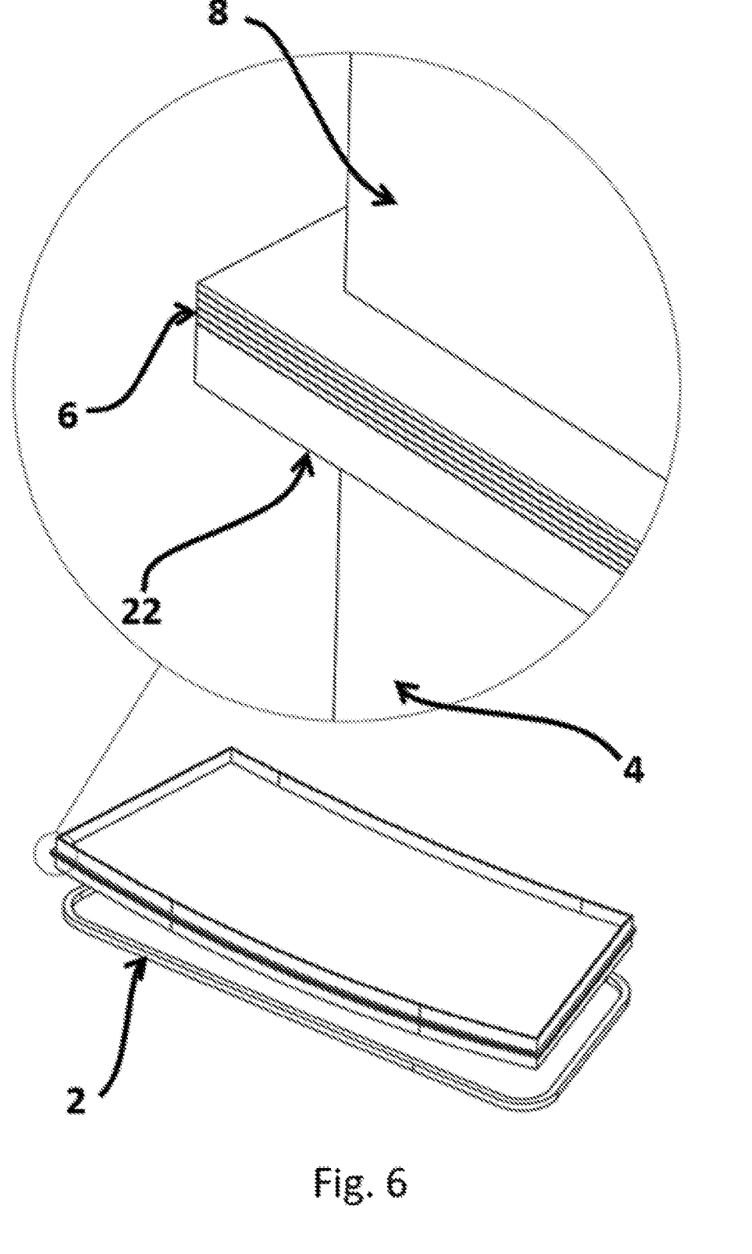
FIG. 6 is a detailed view of the mold with male ring in place.

As can be seen in FIG. 6, a partial surface top mold 8, which contacts the thin glass 6 in at least the periphery area of said thin glass 6, is implemented as a male ring type mold. The male ring 8 is then placed on the stack of thin glass 6. The male ring 8 serves to hold the edge of thin glass 6 down, preventing wrinkling. In additional embodiments, the male ring 8 is held in place by its own weight, or additional weight can be added to the male ring 8 if needed. In addition, clamps may be used to force the thin glass 6 to conform to the full surface female mold 22 if needed (not shown). Furthermore, aligning means may be used to align said thin glass 6 and molds. In preferred embodiments, the male ring mold 8 is open to allow for radiant heating of the thin glass 6 and accelerate the cycle time. This step prevents wrinkles from forming near the edges of thin glass 6. The edges of male ring 8 and female ring 4 may be covered with a material that is softer than glass to prevent marking of the glass.

Figure 7:
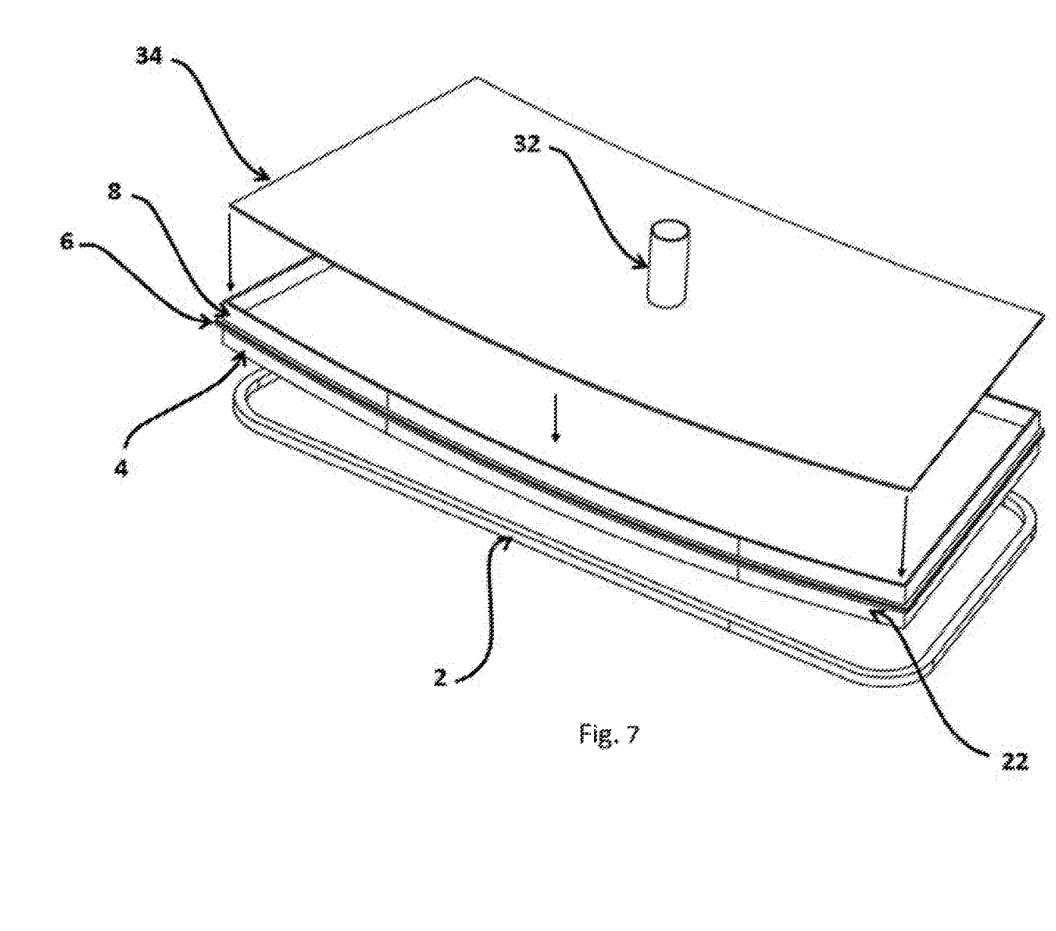
FIG. 7 is a view of the top plenum in raised position.

Optionally, after the thin glass 6 has sagged to a predetermined point, a backing plate 34 (top plenum back) is lowered onto the male ring 8 and docked so as to enclose a volume of air and form a top plenum, as shown in FIG. 7. The top plenum is then pneumatically pressurized, and then heated by means of a hot air flow entering into a top plenum air inlet 32. The heat forces the thin glass 6 to conform to the shape of the full surface female mold 22.

Figure 8:
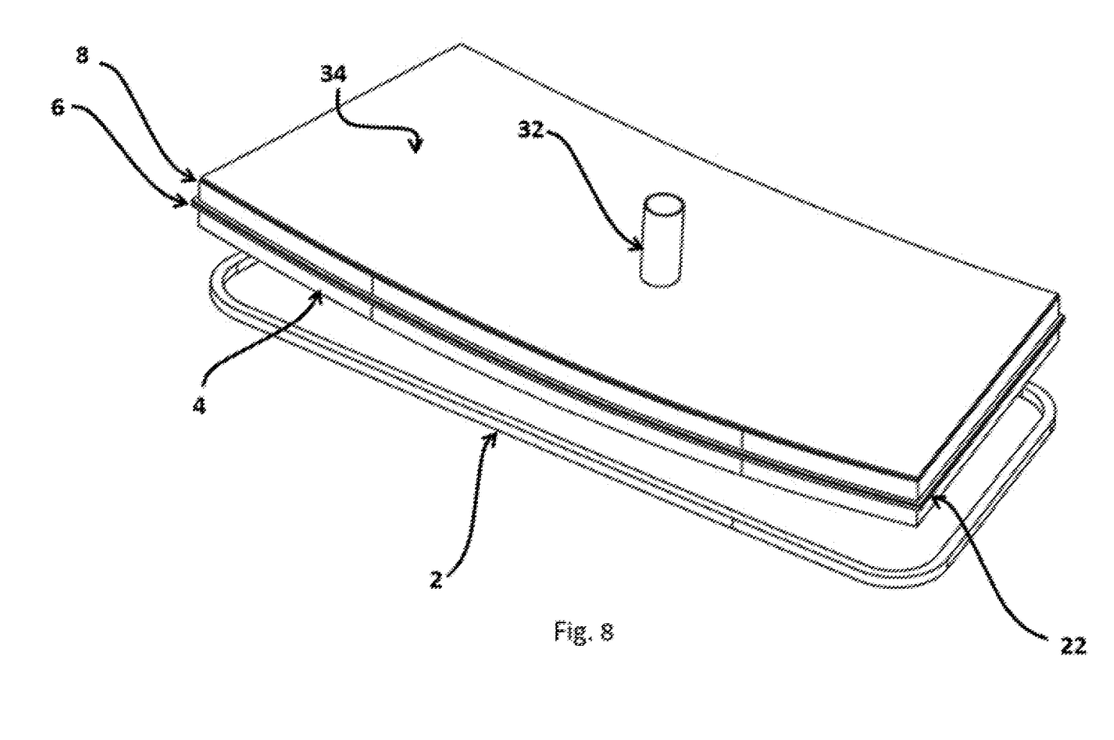
FIG. 8 is a view of the top plenum and mold.
Figure 9:
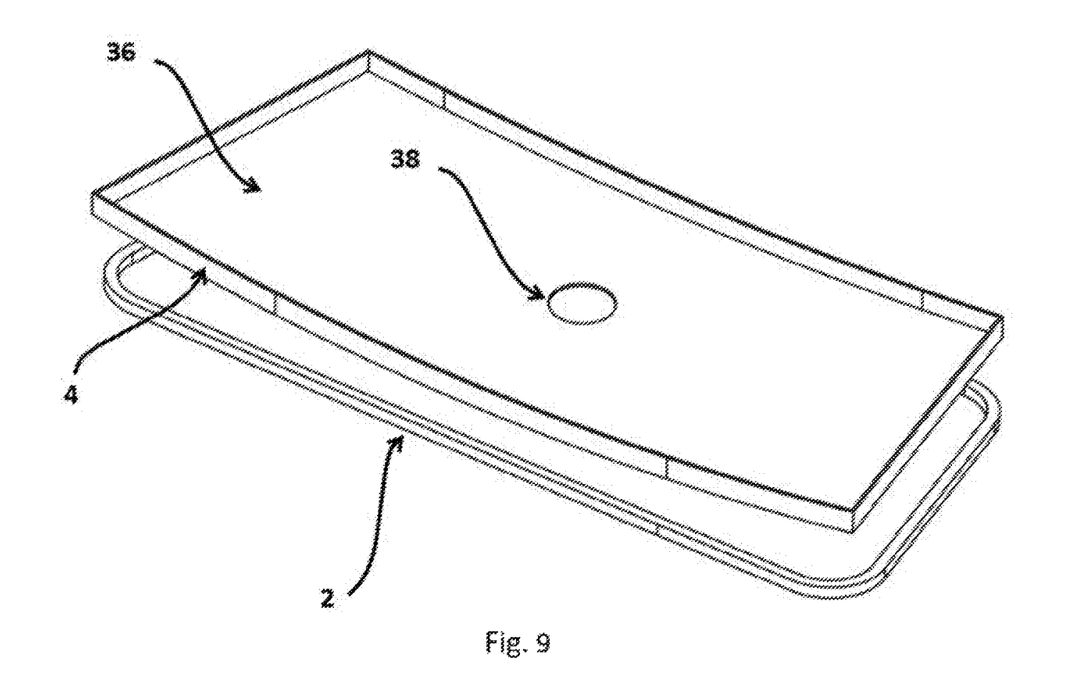
FIG. 9 is a view of the bottom plenum.

In additional embodiments, as the one shown in FIG. 8, the top plenum is pressurized using hot air, forcing the soft thin glass 6 to conform to the full surface female mold 22. The point of application, duration, air temperature and pressure are varied as needed to obtain the desired shape. The application of heating should be performed until reaching the glass transition point. Optionally, the bottom side of the bottom female ring 4 may be enclosed with a backing plate 36 (bottom plenum back) to form a bottom plenum, as shown in FIG. 9.

Figure 10:
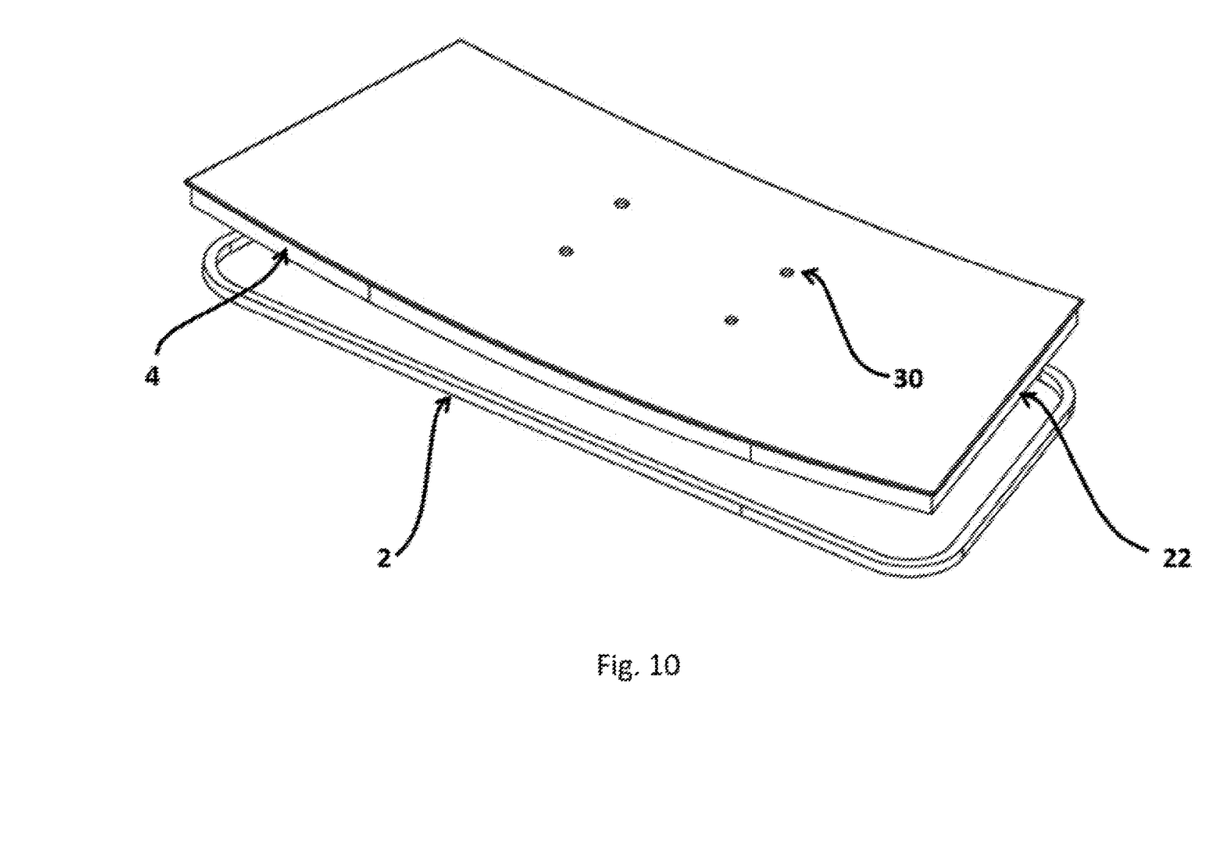
FIG. 10 is a view of the full surface female mold with vacuum holes.

In addition to the previous step or in place of, vacuum can be applied to the full surface female mold 22 in order to press so as to assist in the bending of the thin glass 6. Vacuum can be also applied with the glass cold, to help the glass to conform to the ring and/or at any point during bending, using the vacuum holes 30 shown in FIG. 10. Vacuum can be used alone or in conjunction with the top plenum. Optionally, rather than or in addition to the vacuum holes 30, a bottom plenum vacuum inlet 38 (FIG. 9) can be provided to apply vacuum to the full surface female mold 22 and the thin glass 6, allowing the air between them to evacuate.

The method of the present invention has a number of advantages:
- The pneumatic and/or vacuum assist decreasing the bending cycle time by up to half
- The male ring mold results in prevents wrinkles from forming.
- The male ring mold also serves to hold the thin glass in place preventing it from sagging to soon.
- The use of a bent glass full surface mold reduces the tooling cost as compared to a machine cut or cast mold.
- The use of the full surface female mold results in dimensional surface control sufficient to allow for lamination of plies of different types of glasses that were not bent on the same mold at the same time, increasing the capacity of bending thin glass.
- The present invention improves yield especially on optic due to reduced temperature.
- The present invention improves optic in transmission due reduced temperature. This also improves reflection.
- The present invention also maintains glass edge during complete bending process.

In a first embodiment, a sheet of 8 mm thick Lithium silicate glass 20 is used as the material for the full surface female mold 22. The flat glass 20 is formed on a cast ceramic mold. The bent flat glass 20 is then supported on a bending mold female ring 4 and serves as the full surface female press. The full surface female mold 22 is covered with a layer of glass cloth to help prevent marking of the thin glass. Such a press can be used for at least several hundred bending cycles. Six sheets of 0.7 mm aluminosilicate glass 6 are placed on the full surface female mold 22. The male ring 8 is then applied. The edge of the male ring 8, that comes into contact with the thin glass 6, is covered with glass cloth or and equivalent material to prevent marking of the thin glass 6. No additional weight or clamping is needed to hold the male ring 8 in place although it may be needed on some parts.

In a second embodiment, the steps of embodiment one are repeated. When the thin glass 6 has been heated and softened, the top plenum back 34 is lowered onto the male ring 8. The top plenum is pressurized using hot air from a low pressure blower. The pneumatic pressure forces the softened thin glass 6 to conform to the full surface of the female mold 22.

In a third embodiment, the steps of embodiment one are repeated and vacuum is applied to the bottom plenum to assist in the bending of the thin glass 6.

In a forth embodiment, the steps of embodiment two are repeated and vacuum is applied to the bottom plenum to assist in the bending of the thin glass 6.

The forms of the invention shown and described in this specification represent illustrative preferred embodiments and it is understood that various changes may be made without departing from the spirit of the invention as defined in the following claimed subject matter.

The invention claimed is:

1. A method for bending automotive thin glass sheets, comprising:
    providing a full surface bottom concave mold and a partial surface top mold;
    stacking at least one thin glass sheet onto the full surface bottom concave mold such that the periphery area of said at least one thin glass sheet is in contact with the bottom concave mold;
    applying the partial surface top mold to said at least one thin glass sheet, said partial surface top mold contacting the periphery area of said at least one thin glass sheet; and
    heating said at least one thin glass sheet to its glass transition point such that the at least one thin glass sheet sags under the force of gravity, adopting the shape of the full surface bottom concave mold.

2. The method of claim 1, wherein the thickness of said at least one thin glass sheet is of less than 1.8 mm.

3. The method of claim 1, further comprising applying a clamping force to the at least one thin glass sheet to force said at least one thin glass sheet to conform to the full surface bottom concave mold.

4. The method of claim 1, further comprising aligning said at least one thin glass sheet and molds.

5. The method of claim 1, wherein the step of providing a full surface bottom concave mold comprises: bending a sheet of glass having a glass transition point that is sufficiently higher than that of said at least one thin glass sheet and having a thickness sufficient for said mold to retain its shape during bending of said at least one thin glass sheet.

6. The method of claim 1, wherein the step of providing a partial surface top mold comprises: providing a partial surface top mold having a ring type structure.

7. The method of claim 1, further comprising applying pneumatic pressure to said partial surface top mold constructed such as to enclose a volume of air and serve as a plenum.

8. The method of claim 1, further comprising applying vacuum to said full surface bottom concave mold constructed such as to enclose a volume of air and serve as a plenum to allow evacuation of air between full surface bottom concave mold and said at least one thin glass sheet.

9. The method of claim 1, further comprising adding additional weight to the partial surface top mold.

10. The method of claim 1, further comprising covering the edge of the partial surface top mold that comes in contact with the at least one thin glass sheet with a layer of glass cloth to prevent marking of said at least one thin glass sheet.

* * * * *